(12) United States Patent
Ou-Yang et al.

(10) Patent No.: US 8,290,254 B2
(45) Date of Patent: Oct. 16, 2012

(54) GRAY LEVEL WEIGHTING CENTROID METHOD FOR HOLOGRAPHIC DATA STORAGE

(75) Inventors: Mang Ou-Yang, Hsinchu (TW); Yu-Ta Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 285 days.

(21) Appl. No.: 12/756,470

(22) Filed: Apr. 8, 2010

(65) Prior Publication Data
US 2011/0182505 A1    Jul. 28, 2011

(30) Foreign Application Priority Data

Jan. 22, 2010 (TW) .............................. 99101760 A (51) Int. Cl.
*G06K 9/00* (2006.01)
*G06K 9/64* (2006.01)
(52) U.S. Cl. ........................................ 382/162; 382/279
(58) Field of Classification Search .................. 382/276, 382/279, 286, 288, 162, 100
See application file for complete search history.

(56) References Cited

U.S. PATENT DOCUMENTS

| | | | |
|---|---|---|---|
| 6,697,316 B2* | 2/2004 | Burr | 369/103 |
| 7,848,595 B2* | 12/2010 | Ayres et al. | 382/294 |
| 2010/0135550 A1* | 6/2010 | Arnon | 382/128 |

* cited by examiner

*Primary Examiner* — Yon Couso
(74) *Attorney, Agent, or Firm* — Rosenberg, Klein & Lee (57) ABSTRACT

A gray level weighting centroid method for holographic data storage is disclosed. Firstly, a first gray level image having a plurality of blocks is received. Then, a convolution calculation is performed on a weight matrix and the image, so as to obtain a second gray level image having a plurality of blocks each having a gray level value. The gray level values are divided into a bright gray level value and a dark gray level value by a threshold value, so as to convert the second gray level image into a thresholding image and find the positions of the borders of the blocks corresponding to the bright gray level value. Next, the blocks surrounded by the positions of the borders and respectively used as a centroid block are found by making the positions of the borders correspond to the first gray level image. Finally, the centroid block is calculated to obtain a centroid point.

16 Claims, 7 Drawing Sheets

$$54 \searrow \begin{array}{|c|c|c|c|c|} \hline M''_{11} & M''_{12} & M''_{13} & M''_{14} & M''_{15} \\ \hline M''_{21} & M''_{22} & M''_{23} & M''_{24} & M''_{25} \\ \hline M''_{31} & M''_{32} & M''_{33} & M''_{34} & M''_{35} \\ \hline M''_{41} & M''_{42} & M''_{43} & M''_{44} & M''_{45} \\ \hline M''_{51} & M''_{52} & M''_{53} & M''_{54} & M''_{55} \\ \hline \end{array}$$

Fig. 3(k)

$$58 \searrow \begin{array}{|c|c|c|c|c|} \hline 0 & 1 & 0 & 1 & 0 \\ \hline 1 & 0 & 1 & 0 & 1 \\ \hline 0 & 1 & 0 & 1 & 0 \\ \hline 1 & 0 & 1 & 0 & 1 \\ \hline 0 & 1 & 0 & 1 & 0 \\ \hline \end{array}$$

GRAY LEVEL WEIGHTING CENTROID METHOD FOR HOLOGRAPHIC DATA STORAGE

BACKGROUND OF THE INVENTION

1. Field of the Invention

The present invention relates to a gray level weighting centroid method, particularly to a gray level weighting centroid method for holographic data storage.

2. Description of the Related Art

The major optical storage system in the market is a CD-R machine, wherein the storage medium is CD or DVD. This kind of system focuses laser light on an optic disc through an object lens to bore holes, so as to program and record binary data on the optic disc. But the optic disc is only 2-D recording medium, the capacity of the optic disc is rather limited. Besides, the transmission speed of the optical storage system can't meet the demand required. Although the storage capacity of a hard disc drive is large, the data are transmitted to the hard disc drive in a point-to-point method. Therefore, the transmission speed of storage device has reached its limit and is not able to meet the requirement of transmission speed and storage capacity. However, holographic data storage technology has the advantage of high capacity and high access. Also, the recording medium for the holographic data storage technology is a 3-D recording medium, which transmits a whole page per unit time during transmission process. For example, the 1-TB data can be transmitted completely in around 8 seconds. Without doubt, the holographic data storage device is a promising product having high performance in the next generation.

Figure 1:
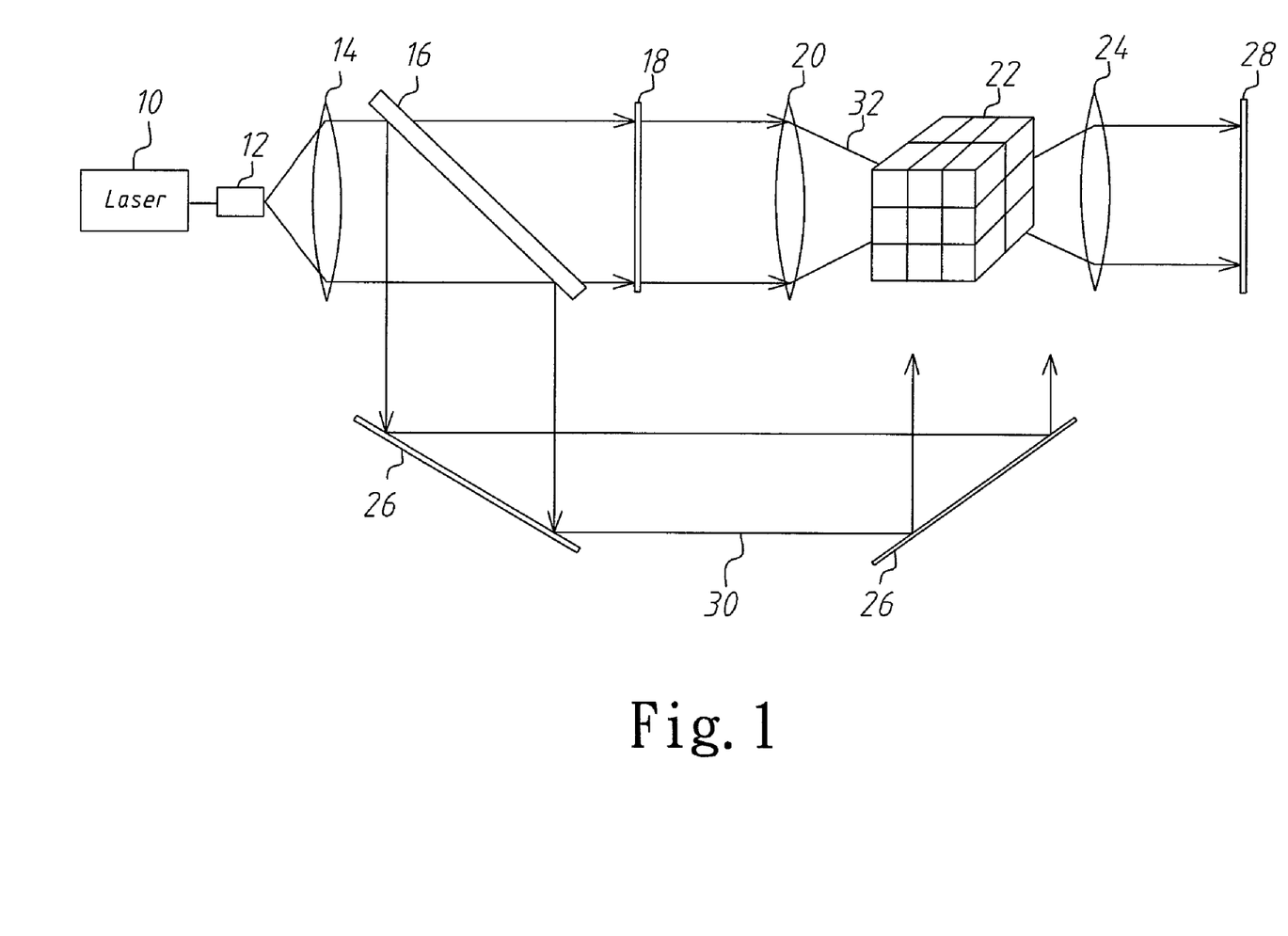
FIG. 1 is a diagram schematically showing a holographic data storage device according to the prior art.

The holographic data storage device has a strict requirement for optical quality and system adjustment. Since in high speed transmission, the holographic data storage device is affected by the noise such as aberration, thus the device is difficult to be a marketable product. Even if the product is existed, the price thereof is still very high, such as the holographic data storage product of Optware and Inphase Company. Refer to FIG. 1, the basic configuration of the holographic data storage device comprises a laser 10, a spatial filter 12, a first lens 14, a splitter 16, a spatial light modulator 18, a second lens 20, a storage medium 22, a third lens 24, a reflector 26, and a 2-D sensor 28. After the laser 10 emits a laser light, the laser light is passed through the spatial filter 12, the first lens 14, and the splitter 16 in sequence, and then the splitter 16 splits the laser light into a reference beam 30 and an object beam 32. Wherein the reference beam 30 moves toward the reflector 26, and the object beam moves toward the spatial light modulator 18. The reflector 26 reflects the reference beam to the storage medium 22. Besides, the spatial light modulator 18 can add the encoding code information to the object beam 32, and then the object beam 32 moves toward the storage medium 22. Finally, the object beam 32 interferes with the reference beam 30 to form a set of interference patterns, whereby the interference patterns are stored on the storage medium 22. Then, the object beam 32 is shielded, and the reference beam 30 left will read out the information from the storage medium 22. After the reference beam 30 is emitted into the storage medium 22, the diffraction light originated from the reference beam 30 is emitted onto the 2-D sensor 28. However, the aberration influence for the holographic data storage device can result in the distorted image received by the 2-D sensor 28.

In view of the problems and shortcomings of the prior art, the present invention provides a gray level weighting centroid method for holographic data storage, so as to solve the aforementioned problems of the prior art.

SUMMARY OF THE INVENTION

An objective of the present invention is to provide a gray level weighting centroid method for holographic data storage, which performs a convolution calculation on a weight matrix and gray level values of an image, so as to find an anchor point for each bit of the image received by a 2-D sensor. The anchor points can prevent the original image from being distorted and out of focus.

To achieve the abovementioned objective, the present invention provides a gray level weighting centroid method for holographic data storage, comprising the steps of receiving a first gray level image having a plurality of first blocks each having a first gray level value; performing a convolution calculation on a weight matrix and the first gray level values, so as to obtain a second gray level image having a plurality of second blocks each having a second gray level value; choosing a threshold value and dividing the second gray level values into a first bright gray level value and a first dark gray level value by the threshold value, whereby the second gray level image is converted into a thresholding image; finding the positions of the boundaries between the first bright gray level value and the first dark gray level value on the thresholding image and defining the positions of the borders of the second blocks corresponding to the first bright gray level value; making the positions of the borders correspond to the first gray level image, so as to find the first blocks surrounded by the positions of the borders and that are used respectively as a centroid block; and performing a calculation on the first gray level values and coordinates of the first blocks of each centroid block, so as to obtain a centroid point respectively.

Below, the embodiments are described in detail in cooperation with the drawings to make easily understood the characteristics, technical contents and accomplishments of the present invention.

DETAILED DESCRIPTION OF THE INVENTION

In the holographic data storage device, a 2-D sensor is used to receive an enlarged gray level image. However, a confused problem is how to restore the gray level image correctly. The image received by the 2-D sensor is affected by the amplification, the noise, and the random error of the holographic data storage device. Therefore, in one of the restoring steps, the coordinates of the anchor points on the received image are determined to restore the pixel size of each signal. Below is the introduction of the gray level weighting centroid method of the present invention. The method is used to obtain the above-mentioned anchor points, which help the gray level image be restored correctly.

Figure 2:
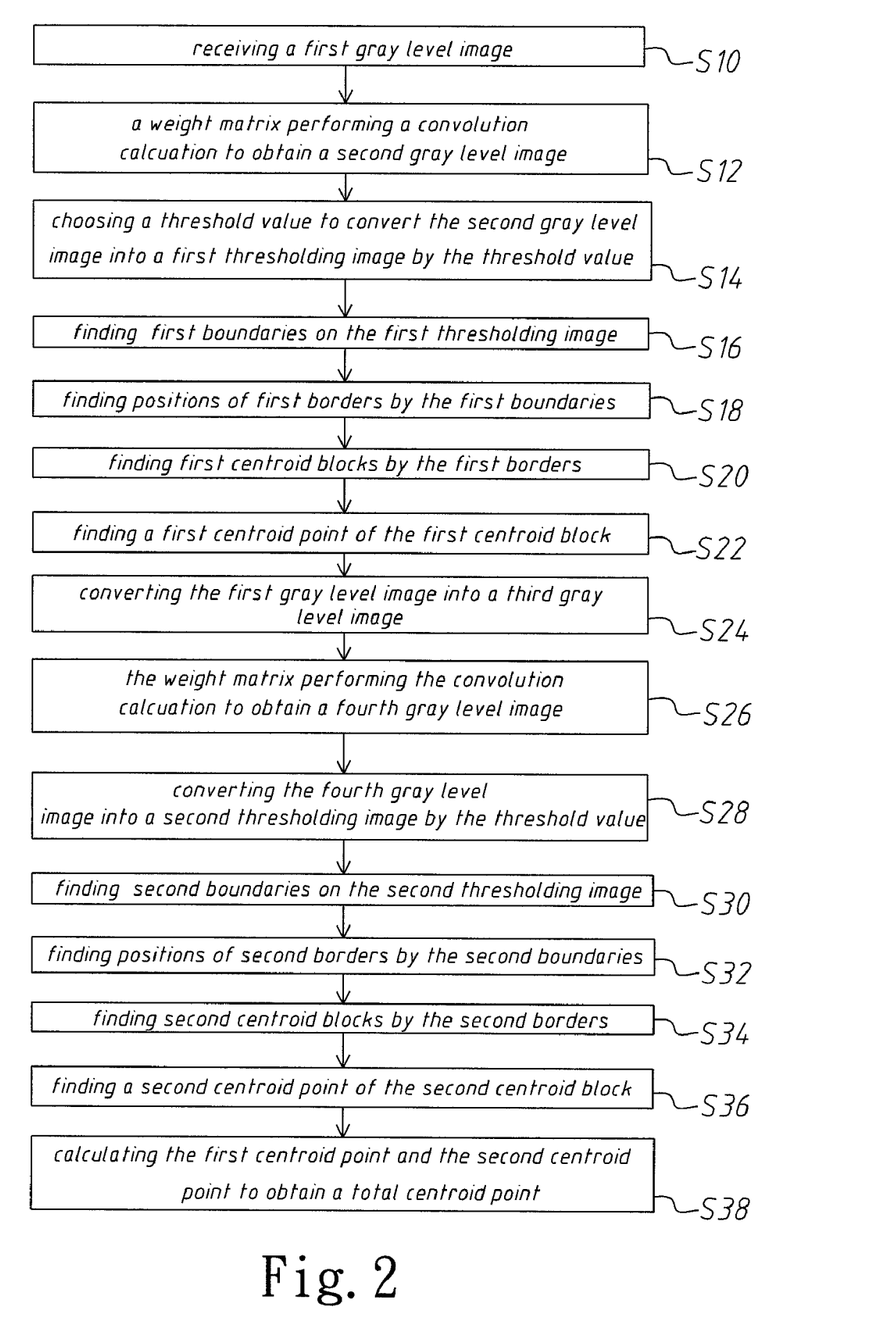
FIG. 2 is a flow chart of the steps of a weighting centroid method according to an embodiment of the present invention.
Figure 3A:
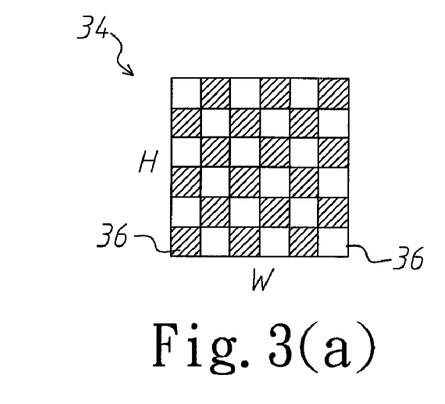
FIGS. 3(a)-3(n) are diagrams schematically showing the steps of an image according to the present invention.
Figure 3B:
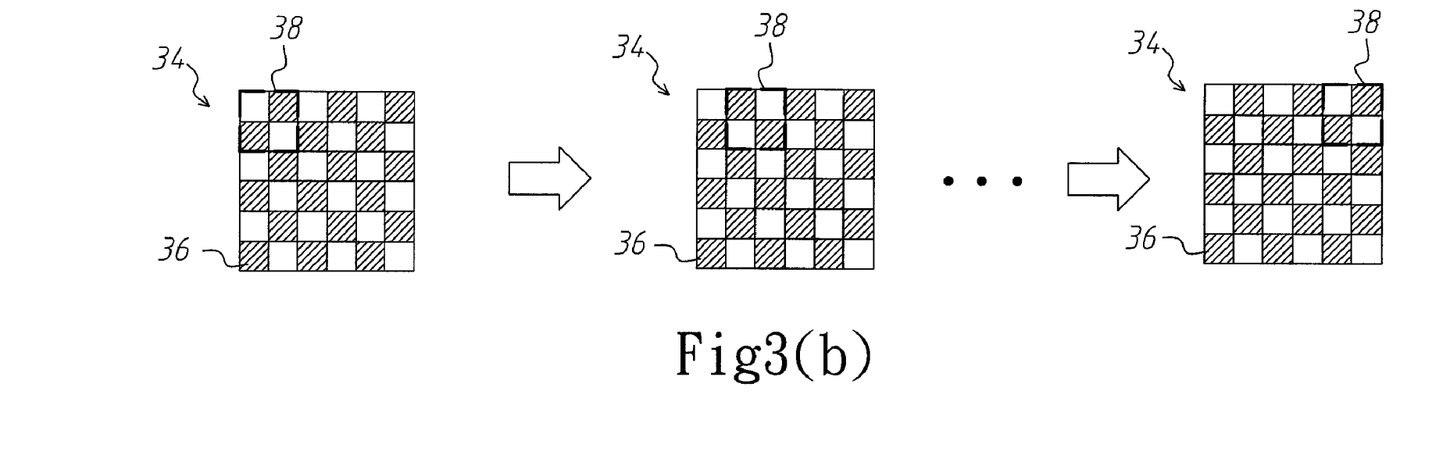
Figure 3C:
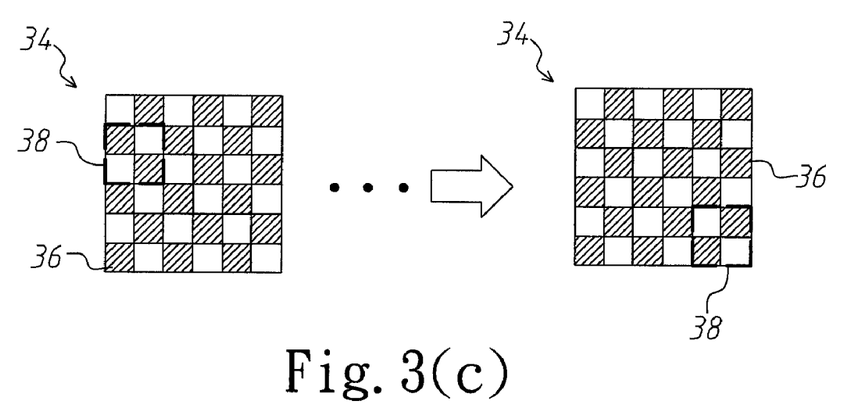
Figure 3D:
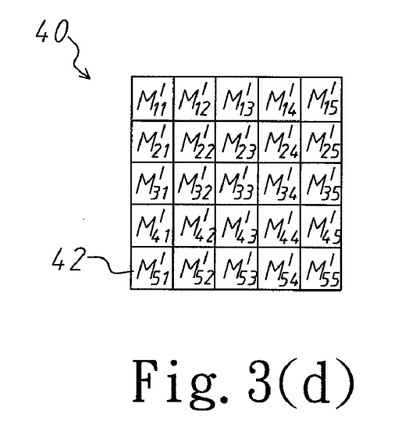
Figure 3E:
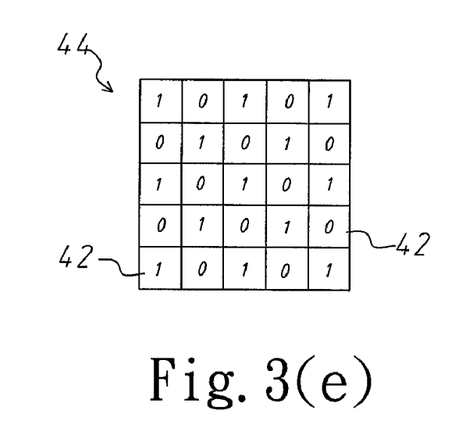
Figure 3F:
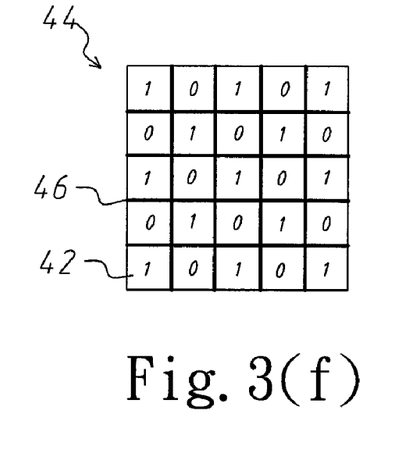
Figure 3G:
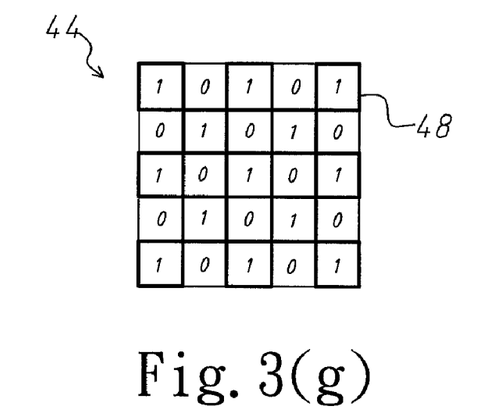
Figure 3H:
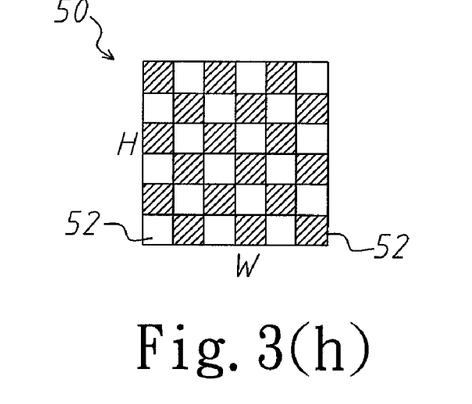
Figure 3I:
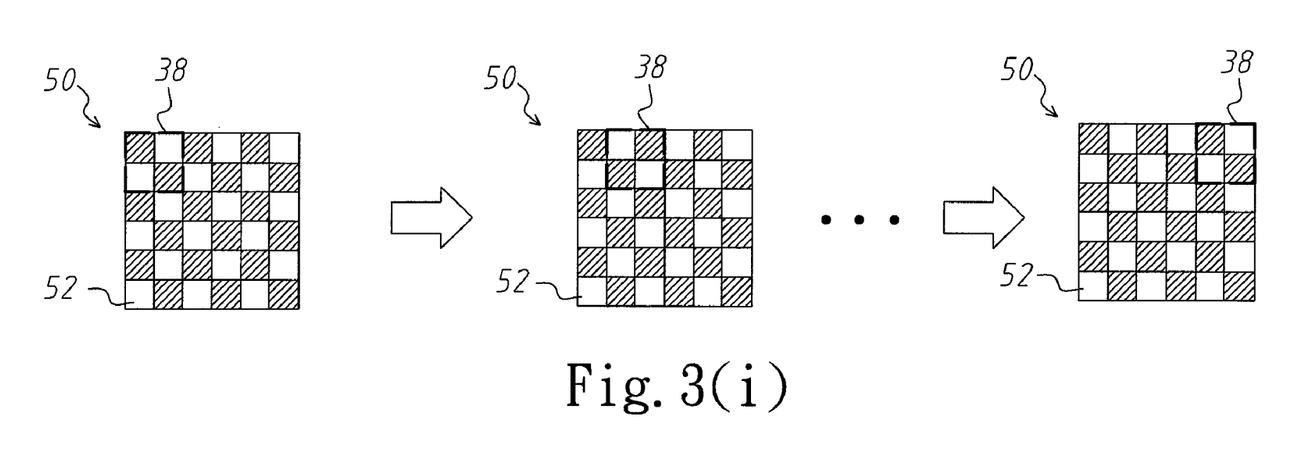
Figure 3J:
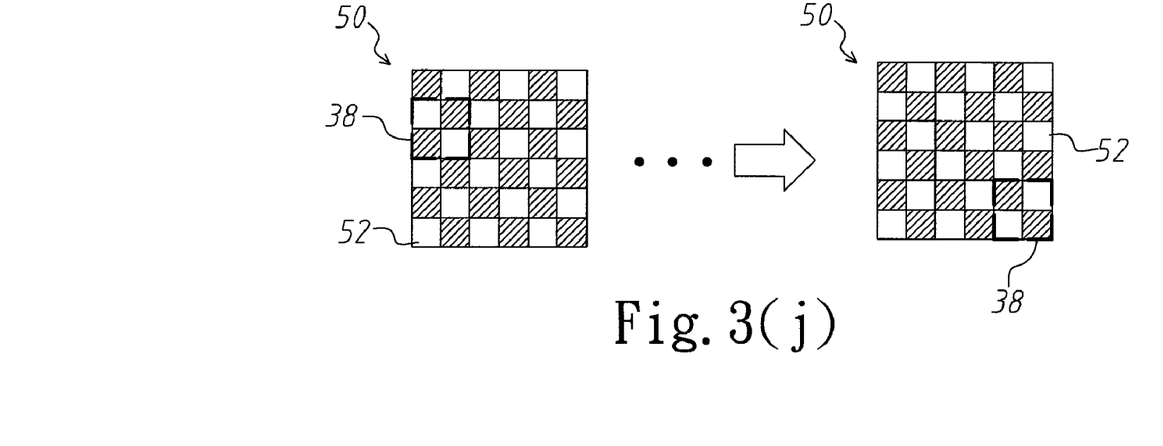
Figure 3K:
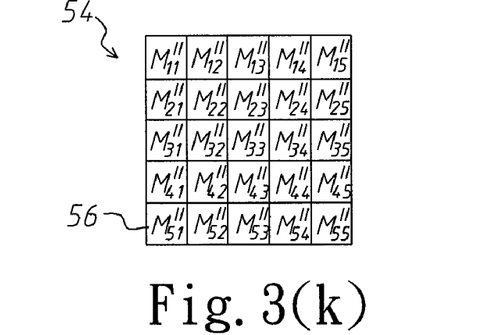
Figure 3L:
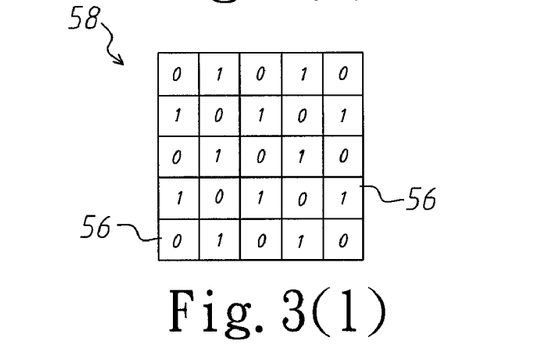
Figure 3M:
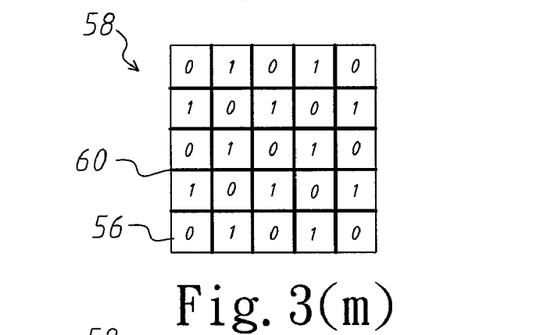
Figure 3N:
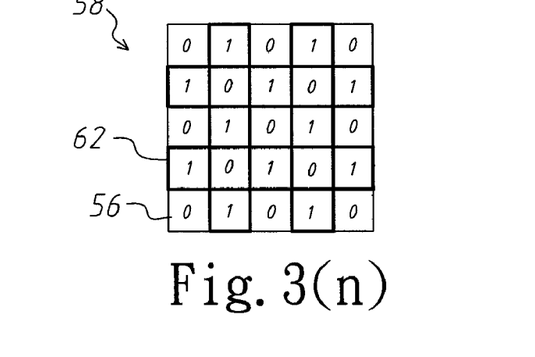

Refer to FIG. 2 and FIGS. 3(a)-3(n). In Step S10, a first gray level image having a plurality of first blocks is received, wherein the gray level depth and the largest gray level of the first gray level image are N bits and $2^N-1$, respectively. Each of the first blocks has a first gray level value $G_{11}^I, G_{12}^I, \ldots, G_{HW}^I$ respectively. The first blocks can be black blocks or white blocks, whereby the first gray level image has a plurality of black blocks and a plurality of white blocks. The number of the black blocks and the white blocks is equal. Also, the black blocks and the white blocks arranged into a checker board is used as an example. Besides, the first gray level image is a square array of H×W, wherein H and W are natural numbers. For example, as shown in FIG. 3(a), which is the square array of 6×6 used as the first gray level image 34 having the 36 first blocks 36, wherein each of the first blocks 36 respectively has a first gray level value $G_{11}^I, G_{12}^I, \ldots,$ and $G_{66}^I$. The first blocks 36 are black blocks or white blocks, wherein the black block is the block having hatches and the white block is the blank block. Also, the black blocks and the white blocks are arranged into a checker board.

Next, in Step S12, a convolution calculation is performed on a weight matrix and the above-mentioned first gray level values, so as to obtain a second gray level image having a plurality of second blocks. Each of the second blocks respectively has a second gray level value $M_{11}^I, M_{12}^I, \ldots,$ and $M_{(H-m+1)(W-n+1)}^I$, wherein the weight matrix is a matrix of m×n. The weight matrix is $$\begin{bmatrix} a_{11} & a_{12} & \cdots & a_{1n} \\ a_{21} & \ddots & & a_{2n} \\ \vdots & & \ddots & \vdots \\ a_{m1} & a_{m2} & \cdots & a_{mn} \end{bmatrix},$$

wherein the values of the weight matrix are arbitrary integrals, and m, and n are all natural numbers.

Each of the second gray level values is obtained from the formula (1):

$$\begin{cases} M_{11}^I = a_{11} \times G_{11}^I + a_{12} \times G_{12}^I + \ldots + a_{mn} \times G_{mn}^I \\ M_{12}^I = a_{11} \times G_{12}^I + a_{12} \times G_{13}^I + \ldots + a_{mn} \times G_{m(n+1)}^I \\ \ldots \\ M_{21}^I = a_{11} \times G_{21}^I + a_{12} \times G_{22}^I + \ldots + a_{mn} \times G_{(m+1)n}^I \\ \ldots \\ M_{(H-m+1)(W-n)}^I = a_{11} \times G_{(H-m+1)(W-n)}^I + a_{12} \times G_{(H-m+1)(W-n+1)}^I + \ldots + a_{mn} \times G_{H(W-1)}^I \\ M_{(H-m+1)(W-n+1)}^I = a_{11} \times G_{(H-m+1)(W-n+1)}^I + a_{12} \times G_{(H-m+1)(W-n+2)}^I + \ldots + a_{mn} \times G_{HW}^I \end{cases} \quad (1)$$

In Step S12, the weight matrix moves from the first block of the first column of the first row of the first gray level image to the first block of the last column of the first row in order, wherein the weight matrix is calculated with the first gray level values corresponding to the first blocks surrounded by the weight matrix in each position that the weight matrix moves; after the weight matrix is calculated with the first row, the weight matrix moves to the next row of the first blocks and repeats above-mentioned movement and calculation until the weight matrix moves to the first block of the last column of the last row of the first gray level image and finishes above-mentioned calculation.

For example, as shown in FIG. 3(b), the weight matrix 38 is a matrix of 2×2. The weight matrix 38 is $$\begin{bmatrix} a_{11} & a_{12} \\ a_{21} & a_{22} \end{bmatrix}.$$

As shown in the left most figure of FIG. 3(b), the weight matrix 38 is positioned on the first block 36 of the first column of the first row. Because the first blocks 36 surrounded by the weight matrix 38 have the first gray level values $G_{11}^I, G_{12}^I, G_{21}^I,$ and $G_{22}^I$, the second gray level value $M_{11}^I$ used as the second gray level value of the second block of the first column of the first row is obtained from the formula (2). Then, the weight matrix 38 moves to the first block 36 of the second column of the first row. Similarly, the second gray level value $M_{12}^I$ used as the second gray level value of the second block of the second column of the first row is obtained from the formula (3). By the same token, the weight matrix repeats above-mentioned movement and the calculation continuously. When the weight matrix 38 moves to the first block 36 of the sixth column of the first row, the second gray level value $M_{15}^I$ used as the second gray level value of the second block of the fifth column of the first row is obtained from the formula (4), as shown in the most right figure of FIG. 3(b).

$$M_{11}^I = a_{11} \times G_{11}^I + a_{12} \times G_{12}^I + a_{21} \times G_{21}^I + a_{22} \times G_{22}^I \quad (2)$$

$$M_{12}^I = a_{11} \times G_{12}^I + a_{12} \times G_{13}^I + a_{21} \times G_{21}^I + a_{22} \times G_{23}^I \quad (3)$$

$$M_{15}^I = a_{11} \times G_{14}^I + a_{12} \times G_{15}^I + a_{21} \times G_{24}^I + a_{22} \times G_{25}^I \quad (4)$$

After the first row of the first blocks 36 are all calculated, the weight matrix 38 moves to the first block 36 of the first column of the second row, as shown in the left most figure of FIG. 3(c). The second gray level value $M_{21}^I$ used as the second gray level value of the second block of the first column of the second row is obtained from the formula (5). Similarly to the above-mentioned movement and calculation, when the weight matrix 38 moves to the first block 36 of the sixth column of the sixth row, the second gray level value $M_{55}^I$ used as the second gray level value of the second block of the fifth column of the fifth row is obtained from the formula (6), as shown in the most right figure of FIG. 3(c).

$$M_{21}^I = a_{11} \times G_{21}^I + a_{12} \times G_{22}^I + a_{21} \times G_{31}^I + a_{22} \times G_{32}^I \quad (5)$$

$$M_{55}^I = a_{11} \times G_{55}^I + a_{12} \times G_{56}^I + a_{21} \times G_{65}^I + a_{22} \times G_{66}^I \quad (6)$$

When the convolution calculation is finished, the second gray level image 40 having 25 second blocks 42 each having a second gray level value $M_{11}^I, M_{12}^I, \ldots,$ and $M_{55}^I$ is obtained, as shown in FIG. 3(d).

After Step S12, Step S14 is executed. In Step S14, a threshold value is chosen and all second gray level values are divided into 1 and 0 by the threshold value, wherein 1 and 0 are respectively used as a first bright gray level value and a first dark gray level value. Accordingly, the second gray level image is converted into a first thresholding image, wherein the second gray level value, which is larger than the threshold value, is converted into the first bright gray level value; the second gray level value, which is smaller than the threshold value, is converted into the first dark gray level value. For example, in the preceding paragraph, the second gray level image 40 having the 25 second blocks 42 is converted into the first thresholding image 44, as shown in FIG. 3(e).

Next, in Step S16, the positions of the first boundaries between the first bright gray level value and the first dark gray level value are found on the first thresholding image. Because the first thresholding image shows the bright blocks and the dark blocks clearly, the positions of first boundaries are easily found. For example, as shown in FIG. 3(f), the positions of the first boundaries 46 on the first thresholding image 44 are represented by a thick line.

Next, in Step S18, the positions of the first borders of the second blocks corresponding to the first bright gray level value is defined by the positions of the first boundaries. For example, as shown in FIG. 3(g), the positions of the first borders 48 on the first thresholding image 44 are represented by a thick line.

Next, in Step S20, the first blocks surrounded by the positions of the first borders and respectively used as a first centroid block are found by making the positions of the first borders correspond to the first gray level image.

Next, in Step S22, upon finding out the first centroid block, the calculation is performed on the first gray level values and coordinates of the first blocks of each first centroid block by utilizing the formulas (7) and (8), so as to respectively obtain a first centroid point.

$$G^I c(x) = \frac{(x^I_{11} \times G^I_{11} + x^I_{12} \times G^I_{12} + \ldots + x^I_{pq} G^I_{pq})}{(G^I_{11} + G^I_{12} + \ldots + G^I_{pq})} \quad (7)$$

$$G^I c(y) = \frac{(y^I_{11} \times G^I_{11} + y^I_{12} \times G^I_{12} + \ldots + y^I_{pq} G^I_{pq})}{(G^I_{11} + G^I_{12} + \ldots + G^I_{pq})} \quad (8)$$

Wherein $G^I c(x)$ is a horizontal coordinate of the first centroid point, $G^I c(y)$ is a vertical coordinate of the first centroid point, each first gray level value of the first centroid block is respectively $G^I_{11}, G^I_{12}, \ldots, G^I_{pq}$, a horizontal coordinate of each first block of the first centroid block is respectively $x^I_{11}, x^I_{12}, \ldots, x^I_{pq}$, and a vertical coordinate of each first block of the first centroid block is respectively $y^I_{11}, y^I_{12}, \ldots, y^I_{pq}$.

The above-mentioned first centroid point is the centroid point of the white block. Then, below is the description of calculating the centroid points of black blocks by referencing the above-mentioned method.

Firstly, in Step S24, the positions of the black blocks are interchanged with the positions of the white blocks, whereby the first gray level image is converted into a third gray level image having a plurality of third blocks each having a third gray level value $G_{11}^{II}, G_{12}^{II}, \ldots,$ and $G_{HW}^{II}$. Also, the third gray level image is a square array of H×W, and H and W are all natural numbers. For example, as shown in FIG. 3(h), which is the square array of 6×6 used as the third gray level image 50 having the 36 third blocks 52, wherein each of the third blocks 52 respectively has a third gray level value $G_{11}^{II}$, $G_{12}^{II}, \ldots,$ and $G_{66}^{II}$. The third blocks 52 are black blocks or white blocks, wherein the black block is the block having hatches and the white block is the blank block. Also, the black blocks and the white blocks are arranged into a checker board.

Next, in Step S26, the convolution calculation is performed on the weight matrix and the above-mentioned third gray level values, so as to obtain a fourth gray level image having a plurality of fourth blocks. Each of the fourth blocks respectively has a fourth gray level value $M_{11}^{II}, M_{12}^{II}, \ldots,$ and $M_{(H-m+1)(W-n+1)}^{II}$.

Each of the fourth gray level values is obtained from the formula (9):

$$\begin{cases} M_{11}^{II} = a_{11} \times G_{11}^{II} + a_{12} \times G_{12}^{II} + \ldots + a_{mn} \times G_{mn}^{II} \\ M_{12}^{II} = a_{11} \times G_{12}^{II} + a_{12} \times G_{13}^{II} + \ldots + a_{mn} \times G_{m(n+1)}^{II} \\ \ldots \\ M_{21}^{II} = a_{11} \times G_{21}^{II} + a_{12} \times G_{22}^{II} + \ldots + a_{mn} \times G_{(m+1)n}^{II} \\ \ldots \\ M_{(H-m+1)(W-n)}^{II} = a_{11} \times G_{(H-m+1)(W-n)}^{II} + a_{12} \times G_{(H-m+1)(W-n+1)}^{II} + \ldots + a_{mn} \times G_{H(W-1)}^{II} \\ M_{(H-m+1)(W-n+1)}^{II} = a_{11} \times G_{(H-m+1)(W-n+1)}^{II} + a_{12} \times G_{(H-m+1)(W-n+2)}^{II} + \ldots + a_{mn} \times G_{HW}^{II} \end{cases} \quad (9)$$

In Step S26, in this step of performing the convolution calculation on the weight matrix and the third gray level values, the weight matrix moves from the third block of the first column of the first row of the third gray level image to the last column of the first row in order, wherein the weight matrix is calculated with the third gray level values corresponding to the third blocks surrounded by the weight matrix in each position that the weight matrix moved; after the weight matrix is calculated with each column of the first row, the weight matrix moves to the next row and repeats above-mentioned movement and calculation until the weight matrix moves to the third block of the last column of the last row of the third gray level image and finishes above-mentioned calculation.

For example, as shown in FIG. 3(i), the weight matrix 38 is a matrix of 2×2. The weight matrix 38 is $$\begin{bmatrix} a_{11} & a_{12} \\ a_{21} & a_{22} \end{bmatrix}.$$

As shown in the left most figure of FIG. 3(i), the weight matrix 38 is positioned on the third block 52 of the first column of the first row. Because the third blocks 52 surrounded by the weight matrix 38 have the third gray level values $G_{11}^{II}, G_{12}^{II}, G_{21}^{II}$ and $G_{22}^{II}$, the fourth gray level value $M_{11}^{II}$ used as the fourth gray level value of the fourth block of the first column of the first row is obtained from the formula (10). Then, the weight matrix 38 moves to the third block 52 of the second column of the first row. Similarly, the fourth gray level value $M_{12}^{II}$ used as the fourth gray level value of the fourth block of the second column of the first row is obtained from the formula (11). By the same token, the weight matrix repeats above-mentioned movement and the calculation continuously. When the weight matrix 38 moves to the third block 52 of the sixth column of the first row, the fourth gray level value $M_{15}^{II}$ used as the fourth gray level value of the fourth block of the fifth column of the first row is obtained from the formula (12), as shown in the most right figure of FIG. 3(i).

$$M_{11}^{II} = a_{11} \times G_{11}^{II} + a_{12} \times G_{12}^{II} + a_{21} \times G_{21}^{II} + a_{22} G_{22}^{II} \quad (10)$$

$$M_{12}^{II} = a_{11} \times G_{12}^{II} + a_{12} \times G_{13}^{II} + a_{21} \times G_{22}^{II} + a_{22} \times G_{23}^{II} \quad (11)$$

$$M_{15}^{II} = a_{11} \times G_{14}^{II} + a_{12} \times G_{15}^{II} + a_{21} \times G_{24}^{II} + a_{22} \times G_{25}^{II} \quad (12)$$

After the third blocks 52 of the first row are all calculated, the weight matrix 38 moves to the third blocks 52 of the first column of the second row, as shown in the left most figure of FIG. 3(j). The fourth gray level value $M_{21}^{II}$ used as the fourth gray level value of the fourth block of the first column of the second row is obtained from the formula (13). Similar to the above-mentioned movement and calculation, when the weight matrix 38 moves to the third block 52 of the sixth column of the sixth row, the fourth gray level value $M_{55}^{II}$ used as the fourth gray level value of the fourth block of the fifth column of the fifth row is obtained from the formula (14), as shown in the right most figure of FIG. 3(j).

$$M_{21}^{II}=a_{11}\times G_{21}^{II}+a_{12}\times G_{22}^{II}+a_{21}\times G_{31}^{II}+a_{22}\times G_{32}^{II} \quad (13)$$

$$M_{55}^{II}=a_{11}\times G_{55}^{II}+a_{12}\times G_{56}^{II}+a_{21}\times G_{65}^{II}+a_{22}\times G_{66}^{II} \quad (14)$$

When the convolution calculation is finished, the fourth gray level image 54 having 25 fourth blocks 56 each having a fourth gray level value $M_{11}^{II}, M_{12}^{II}, \ldots,$ and $M_{55}^{II}$ is obtained, as shown in FIG. 3(k).

After Step S26, Step S28 is executed. In Step S28, all fourth gray level values are divided into 1 and 0 by the threshold value, wherein 1 and 0 are respectively used as a second bright gray level value and a second dark gray level value. Accordingly, the fourth gray level image is converted into a second thresholding image, wherein the fourth gray level value, which is larger than the threshold value, is converted into the second bright gray level value; the fourth gray level value, which is smaller than the threshold value, is converted into the second dark gray level value. For example, in the preceding paragraph, the fourth gray level image 54 having the 25 fourth blocks 56 is converted into the second thresholding image 58 by using the threshold value, as shown in FIG. 3(l).

Next, in Step S30, the positions of the second boundaries between the second bright gray level value and the second dark gray level value are found on the second thresholding image. Because the second thresholding image shows the bright blocks and the dark blocks clearly, the positions of second boundaries are easily found. For example, as shown in FIG. 3(m), the positions of the second boundaries 60 on the second thresholding image 58 are represented by a thick line.

Next, in Step S32, the positions of the second borders of the fourth blocks corresponding to the second bright gray level value is defined by the positions of the first boundaries. For example, as shown in FIG. 3(n), the positions of the second borders 62 on the second thresholding image 58 are represented by a thick line.

Next, in Step S34, the third blocks surrounded by the positions of the second borders and respectively used as a second centroid block are found by making the positions of the second borders correspond to the third gray level image.

Next, in Step S36, the calculation is performed on the third gray level values and coordinates of the third blocks of each second centroid block by utilizing the formulas (15) and (16), so as to respectively obtain a second centroid point.

$$G^{II}c(x) = \frac{(x_{11}^{II}\times G_{11}^{II}+x_{12}^{II}\times G_{12}^{II}+\ldots+x_{pq}^{II}G_{pq}^{Ol})}{(G_{11}^{II}+G_{12}^{II}+\ldots+G_{pq}^{II})} \quad (15)$$

$$G^{II}c(y) = \frac{(y_{11}^{II}\times G_{11}^{II}+y_{12}^{II}\times G_{12}^{II}+\ldots+y_{pq}^{II}G_{pq}^{II})}{(G_{11}^{II}+G_{12}^{II}+\ldots+G_{pq}^{II})} \quad (16)$$

Wherein $G^{II}c(x)$ is a horizontal coordinate of the second centroid point, $G^{II}c(y)$ is a vertical coordinate of the second centroid point, each third gray level value of the second centroid block is respectively $G_{11}^{II}, G_{12}^{II}, \ldots, G_{pq}^{II}$, a horizontal coordinate of each third block of the second centroid block is respectively $x_{11}^{II}, x_{12}^{II}, \ldots, x_{pq}^{II}$, and a vertical coordinate of each third block of the second centroid block is respectively $y_{11}^{II}, y_{12}^{II}, \ldots, y_{pq}^{II}$.

The second centroid point is the centroid point of the black block.

Finally, in Step S38, the coordinates of the first centroid point and the second centroid point are consolidated to obtain a total centroid point. The total centroid point not only has the positional information of the first centroid point and the second centroid point but it is also used as the anchor point for the image received by the 2-D sensor. The anchor point is used to reduce the requirement for image quality and image alignment of the optical system. In other words, as to the holographic data storage of high quality, the original image is still prevented from being distorted and out of focus by using the lower cost optical system in cooperation with the method provided by the present invention. Therefore, the gray level image received by the 2-D sensor is restored correctly.

In the above-mentioned steps, Steps S24-S38 can be omitted. The first centroid point can be calculated and used as the anchor point for the image received by the 2-D sensor whereby the original image is prevented from being distorted and out of focus.

In conclusion, the present invention performs a convolution calculation on the gray level values of the received image by using a weight matrix, so as to find an anchor point of each bit for the image received by a 2-D sensor. The anchor points can prevent the original image from being distorted and out of focus.

The embodiments described above are only to exemplify the present invention but not to limit the scope of the present invention. Therefore, any equivalent modification or variation according to the shape, structures, characteristics and spirit disclosed in the present invention is to be also included within the scope of the present invention.

What is claimed is:

1. A gray level weighting centroid method for holographic data storage, comprising steps of:
   establishing a processor and a 2-D sensor for receiving a first gray level image;
   receiving said first gray level image having a plurality of first blocks each having a first gray level value;
   performing a convolution calculation with said processor on a weight matrix and said first gray level values, so as to obtain a second gray level image having a plurality of second blocks each having a second gray level value;
   choosing a threshold value and dividing said second gray level values into a first bright gray level value and a first dark gray level value by said threshold value, whereby said second gray level image is converted into a first thresholding image;
   finding positions of first boundaries between said first bright gray level value and said first dark gray level value on said first thresholding image and defining positions of first borders of said second blocks corresponding to said first bright gray level value;
   making said positions of said first borders correspond to said first gray level image, so as to find said first blocks surrounded by said position of said first borders and used respectively as a first centroid block; and
   performing a calculation with said processor on said first gray level values and coordinates of said first blocks of each said first centroid block, so as to obtain respectively a first centroid point.

2. The gray level weighting centroid method for holographic data storage according to claim 1, wherein
said first gray level image is a square array of H×W, each said first gray level value is respectively $G_{11}^I, G_{12}^I, \ldots,$ and $G_{HW}^I$, and said weight matrix is a matrix of m×n; said weight matrix is $$\begin{bmatrix} a_{11} & a_{12} & \cdots & a_{1n} \\ a_{21} & \ddots & & a_{2n} \\ \vdots & & \ddots & \vdots \\ a_{m1} & a_{m2} & \cdots & a_{mn} \end{bmatrix},$$

wherein values of said weight matrix are arbitrary integrals, and H, W, m, and n are all natural numbers.

3. The gray level weighting centroid method for holographic data storage according to claim 2, wherein
each said second gray level value is respectively obtained from following formulas:

$$M_{11}^I = a_{11} \times G_{11}^I + a_{12} \times G_{12}^I + \ldots + a_{mn} \times G_{mn}^I;$$
$$M_{12}^I = a_{11} \times G_{12}^I + a_{12} \times G_{13}^I + \ldots + a_{mn} \times G_{m(n+1)}^I;$$
$$\vdots$$
$$M_{21}^I = a_{11} \times G_{21}^I + a_{12} \times G_{22}^I + \ldots + a_{mn} \times G_{(m+1)n}^I;$$
$$\vdots$$
$$M_{(H-m+1)(W-n)}^I =$$
$$a_{11} \times G_{(H-m+1)(W-n)}^I + a_{12} \times G_{(H-m+1)(W-n+1)}^I + \ldots + a_{mn} \times G_{H(W-1)}^I;$$
and
$$M_{(H-m+1)(W-n+1)}^I =$$
$$a_{11} \times G_{(H-m+1)(W-n+1)}^I + a_{12} \times G_{(H-m+1)(W-n+2)}^I + \ldots + a_{mn} \times G_{HW}^I,$$

wherein each said second gray level value is respectively $M_{11}^I, M_{12}^I, \ldots,$ and $M_{(H-m+1)(W-n+1)}^I$.

4. The gray level weighting centroid method for holographic data storage according to claim 1, wherein
in said step of performing said convolution calculation of said weight matrix and said first gray level values, said weight matrix moves from said first block of a first column of a first row of said first gray level image to said first block of a last column of said first row in order, wherein said weight matrix is calculated with said first gray level values corresponding to said first blocks surrounded by said weight matrix in each position that said weight matrix moves; after said weight matrix is calculated with each column of said first row, said weight matrix moves to a next row and repeats above-mentioned movement and calculation until said weight matrix moves to said first block of said last column of a last row of said first gray level image and finishes above-mentioned calculation.

5. The gray level weighting centroid method for holographic data storage according to claim 1, wherein
said first centroid point is obtained from following formulas:

$$G^I c(x) = \frac{(x_{11}^I \times G_{11}^I + x_{12}^I \times G_{12}^I + \ldots + x_{pq}^I G_{pq}^I)}{(G_{11}^I + G_{12}^I + \ldots + G_{pq}^I)}; \text{ and}$$

$$G^I c(y) = \frac{(y_{11}^I \times G_{11}^I + y_{12}^I \times G_{12}^I + \ldots + y_{pq}^I G_{pq}^I)}{(G_{11}^I + G_{12}^I + \ldots + G_{pq}^I)},$$

wherein $G^I c(x)$ is a horizontal coordinate of said first centroid point, $G^I c(y)$ is a vertical coordinate of said first centroid point, each said first gray level value of said first centroid block is respectively $G_{11}^I, G_{12}^I, \ldots, G_{pq}^I$, a horizontal coordinate of each said first block of said first centroid block is respectively $x_{11}^I, x_{12}^I, \ldots, x_{pq}^I$, and a vertical coordinate of each said first block of said first centroid block is respectively $y_{11}^I, y_{12}^I, \ldots, y_{pq}^I$.

6. The gray level weighting centroid method for holographic data storage according to claim 1, wherein
said second gray level value, which is larger than said threshold value, is converted into said first bright gray level value; said second gray level value, which is smaller than said threshold value, is converted into said first dark gray level value.

7. The gray level weighting centroid method for holographic data storage according to claim 1, wherein
said first bright gray level value is 1 and said first dark gray level value is 0.

8. The gray level weighting centroid method for holographic data storage according to claim 1, wherein
said first blocks are black blocks or white blocks, whereby said first gray level image has a plurality of said black blocks and a plurality of said white blocks.

9. The gray level weighting centroid method for holographic data storage according to claim 8, wherein
said black blocks and said white blocks are arranged into a checker board.

10. The gray level weighting centroid method for holographic data storage according to claim 8, further comprising steps of:
interchanging positions of said black blocks with positions of said white blocks, so as to convert said first gray level image into a third gray level image having a plurality of third blocks each having a third gray level value;
performing a convolution calculation of said weight matrix and said third gray level values, so as to obtain a fourth gray level image having a plurality of fourth blocks each having a fourth gray level value;
dividing said fourth gray level values into a second bright gray level value and a second dark gray level value by said threshold value, whereby said fourth gray level image is converted into a second thresholding image;
finding positions of second boundaries between said second bright gray level value and said second dark gray level value on said second thresholding image and defining positions of second borders of said fourth blocks corresponding to said second bright gray level value;
making said positions of said second borders correspond to said third gray level image, so as to find said third blocks surrounded by said positions of said second borders and used respectively as a second centroid block;
performing a calculation of said third gray level values and coordinates of said third blocks of each said second centroid block, so as to obtain respectively a second centroid point; and
calculating said first centroid point and said second centroid point to obtain a total centroid point.

11. The gray level weighting centroid method for holographic data storage according to claim 10, wherein
said third gray level image is a square array of H×W, each said third gray level value is respectively $G_{11}^{II}$, $G_{12}^{II}, \ldots, G_{HW}^{II}$, and said weight matrix is a matrix of m×n; said weight matrix is $$\begin{bmatrix} a_{11} & a_{12} & \cdots & a_{1n} \\ a_{21} & \ddots & & a_{2n} \\ \vdots & & \ddots & \vdots \\ a_{m1} & a_{m2} & \cdots & a_{mn} \end{bmatrix},$$

wherein values of said weight matrix are arbitrary integrals, and H, W, m, and n are all natural numbers.

12. The gray level weighting centroid method for holographic data storage according to claim 11, wherein
each said fourth gray level value is respectively obtained from following formulas:

$$M_{11}^{II} = a_{11} \times G_{11}^{II} + a_{12} \times G_{12}^{II} + \ldots + a_{mn} \times G_{mn}^{II};$$

$$M_{12}^{II} = a_{11} \times G_{12}^{II} + a_{12} \times G_{13}^{II} + \ldots + a_{mn} \times G_{m(n+1)}^{II};$$

$$\vdots$$

$$M_{21}^{II} = a_{11} \times G_{21}^{II} + a_{12} \times G_{22}^{II} + \ldots + a_{mn} \times G_{(m+1)n}^{II};$$

$$\vdots$$

$$M_{(H-m+1)(W-n)}^{II} =$$
$$a_{11} \times G_{(H-m+1)(W-n)}^{II} + a_{12} \times G_{(H-m+1)(W-n+1)}^{II} + \ldots + a_{mn} \times G_{H(W-1)}^{II};$$

and $$M_{(H-m+1)(W-n+1)}^{II} =$$
$$a_{11} \times G_{(H-m+1)(W-n+1)}^{II} + a_{12} \times G_{(H-m+1)(W-n+2)}^{II} + \ldots + a_{mn} \times G_{HW}^{II},$$

wherein each said fourth gray level value is respectively $M_{11}^{II}, M_{12}^{II}, \ldots,$ and $M_{(H-m+1)(W-n+1)}^{II}$.

13. The gray level weighting centroid method for holographic data storage according to claim 10, wherein
in said step of performing said convolution calculation of said weight matrix and said third gray level values, said weight matrix moves from said third block of a first column of a first row of said third gray level image to said third block of a last column of said first row in order, wherein said weight matrix is calculated with said third gray level values corresponding to said third blocks surrounded by said weight matrix in each position that said weight matrix moves; after said weight matrix is calculated with each column of said first row of said third gray level image, said weight matrix moves to a next row and repeats above-mentioned movement and calculation until said weight matrix moves to said third block of said last column of a last row of said third gray level image and finishes above-mentioned calculation.

14. The gray level weighting centroid method for holographic data storage according to claim 10, wherein
said second centroid point is obtained from following formulas:

$$G^{II}c(x) = \frac{(x_{11}^{II} \times G_{11}^{II} + x_{12}^{II} \times G_{12}^{II} + \ldots + x_{pq}^{II} G_{pq}^{OI})}{(G_{11}^{II} + G_{12}^{II} + \ldots + G_{pq}^{II})}; \text{ and}$$

$$G^{II}c(y) = \frac{(y_{11}^{II} \times G_{11}^{II} + y_{12}^{II} \times G_{12}^{II} + \ldots + y_{pq}^{II} G_{12}^{II})}{(G_{11}^{II} + G_{12}^{II} + \ldots + G_{pq}^{II})},$$

wherein $G^{II}c(x)$ is a horizontal coordinate of said second centroid point, $G^{II}c(y)$ is a vertical coordinate of said second centroid point, each said third gray level value of said second centroid block is respectively $G_{11}^{II}, G_{12}^{II}, \ldots, G_{pq}^{II}$, a horizontal coordinate of each said third block of said second centroid block is respectively $x_{11}^{II}, x_{12}^{II}, \ldots, x_{pq}^{II}$, and a vertical coordinate of each said third block of said second centroid block is respectively $y_{11}^{II}, y_{12}^{II}, \ldots, y_{pq}^{II}$.

15. The gray level weighting centroid method for holographic data storage according to claim 10, wherein
said fourth gray level value, which is larger than said threshold value, is converted into said second bright gray level value; said fourth gray level value, which is smaller than said threshold value, is converted into said second dark gray level value.

16. The gray level weighting centroid method for holographic data storage according to claim 10, wherein
said second bright gray level value is 1 and said second dark gray level value is 0.

* * * * *